March 17, 1964     K. RANTSCH     3,124,880
MEASURING DEVICE WITH A GUIDE WAY ADAPTED TO MEASURE THE
DISPLACEMENT OF A SLIDABLE CARRIAGE THEREIN
Filed March 14, 1960     2 Sheets-Sheet 2
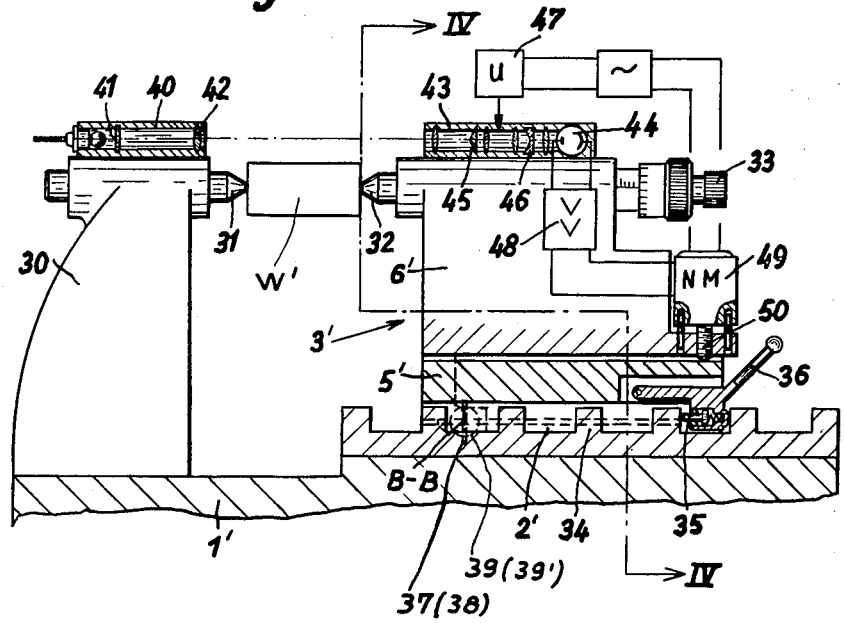
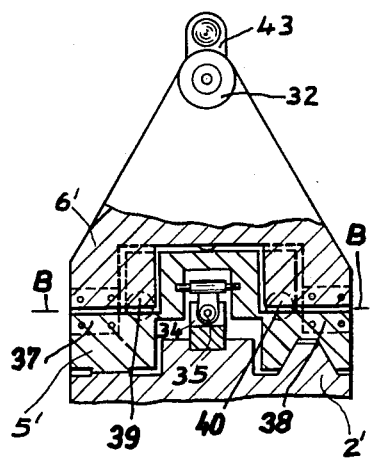
INVENTOR
BY
ATTORNEY United States Patent Office 3,124,880
Patented Mar. 17, 1964

3,124,880
MEASURING DEVICE WITH A GUIDE WAY ADAPTED TO MEASURE THE DISPLACEMENT OF A SLIDABLE CARRIAGE THEREIN
Kurt Rantsch, Wetzlar (Lahn), Germany, assignor to M. Hensoldt & Söhne Optische Werke AG., Wetzlar (Lahn), Germany
Filed Mar. 14, 1960, Ser. No. 17,725
Claims priority, application Germany Mar. 12, 1959
4 Claims. (Cl. 33—143)

The invention relates to a measuring device with a guide way adapted to measure the displacement of a slidable carriage therein. The slidable carriage may belong to a machine tool, length measuring device, or the like.

It is known to provide devices of this type with means for eliminating measuring errors which occur as a result of inaccuracies in the guide way. These known means consist of purely optical elements.

It is an object of the invention to provide a length measuring device in which the slidable carriage is subdivided into two parts, one of which is slidable in the guide way while the other part is mounted tiltably on the first part and, furthermore, the tiltable part of the carriage is provided with a direction indicator such as a tubular level, a collimator device (telescope), or the like. If in a device constructed in accordance with the present invention the carriage tilts in its guide way as a result of an inaccuracy in the same, then the direction indicator indicates the deviation from the normal position of the carriage. The upper part of the carriage is now adjusted by a tilting movement until it again will assume its normal postion with respect to the guide way.

In general the axis of rotation of the top part of the carriage will not coincide with the axis of rotation of the entire carriage structure when it is tilted as the result of an inaccuracy in the guide way, because the location of the axis of rotation is not known from the beginning.

For this reason a measuring point, for instance the point of the tail spindle arranged in the carriage of a length measuring device, need not be positioned at the same point in which it was positioned prior to the tilting movement after the upper part of the carriage structure has been adjusted. Indeed, this point may be displaced somewhat laterally and also somewhat in the vertical direction. A deviation in the vertical direction is not important for the measurement. A deviation from the measuring point in the lateral direction is of no importance only when the reading of the measuring value takes place with the assistance of a measuring scale and with the assistance of elements arranged in the carriage. The carriage is adjusted sufficiently until the point of the tail spindle again touches the workpiece to be measured. When this readjustment is accomplished then it is possible to read the correct value on the measuring scale.

It is another object of the present invention to eliminate this readjustment when the tail spindle in the carriage is slidable against the pressure of a spring and when the tail spindle has an objective connected thereto which projects the measuring value into a reading window of a reading device. In such a case the lateral displacement of the point of the tail spindle will be automatically compensated by the power of the spring. The optical axis of the projection objective is hereby adjusted according to the measuring scale. If, however, the device is not provided with a reading device for the measuring scale, and the carriage is adjusted, for instance, step by step by means of a series of abutments on the guide way and when the tail spindle for the purpose of bridging the steps of the abutments is adjustable by means of a micrometer, then it would be necessary to perform a readjustment of the tail spindle by means of a micrometer when the point of the tail spindle after the tilting movement of the upper part of the carriage structure does not return to its starting point. Such a readjustment, however, changes the adjusted micrometer value so that a measuring error would occur. In such a device the error which occurs is made practically zero when according to the invention the axis of rotation is placed in or near the neighborhood of the guide way itself. If the device of the present invention is provided with a slidable carriage adapted to be movable in two directions which are perpendicular to one another which is the case with coordinate tables, then the previously mentioned means are suitably arranged in both directions of displacement.

The size of the slidable displacement of such a coordinate table is determined frequently with the assistance of a stationary arranged grid scale whereby a projection objective is moved relatively to the grid scale with the table or vice versa. This projection objective projects a portion of the grid scale into the window of a reading device, or into two reading windows of two reading devices in case each direction of slidable displacement is provided with a reading device.

Such a coordinate table is preferably provided with an autocollimation device which is used as a direction indicator whereby the stationary mirror of this autocollimation device is formed of the grid scale the surface of which is a mirror surface. If now the table tilts as the result of an error in the guide way, then the grid scale performs the same tilting movement. An indicating mark projected by the autocollimation telescope upon the grid scale will accordingly not be projected into the reticle of the autocollimation telescope. It is then necessary, for instance by means of two adjusting screws, to readjust the table in such a manner that the plane of the table will again be arranged parallel to the grid scale.

The readjustment of the top part of the carriage can be effected manually. It is, however, advisable that for each direction of slidable displacement a resetting device be employed which is controlled by the direction indicator.

If the direction indicator is formed by a collimator arranged on a stationary part of the machine and by a straight line telescope connected with the tiltable part of the carriage or vice versa, then it is of advantage to provide in the straight line telescope a photoelectric cell or the like for the control of a resetting motor.

It is preferred that the projection beam of the collimation mirror in the straight line telescope be split in conventional manner and that the two split light beams be modulated in order to produce an alternating current. Such an alternating current can be employed in simple manner for the control of the resetting motor.

With this and other objects in view the invention will now be described with reference to the accompanying drawings which illustrate several embodiments of the invention:

FIG. 3 illustrates in a side elevation view and partly in section another embodiment of the invention; and FIG. 4 illustrates in vertical cross section a view along the line IV—IV of FIG. 3.

Figure 1:
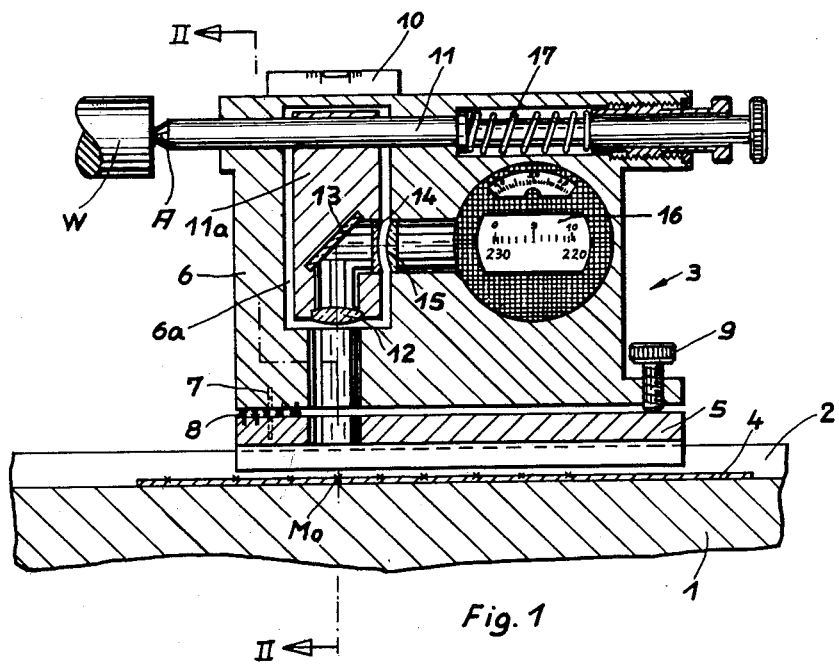
FIG. 1 is a vertical sectional view of the slidable carriage of a length measuring device.
Figure 2:
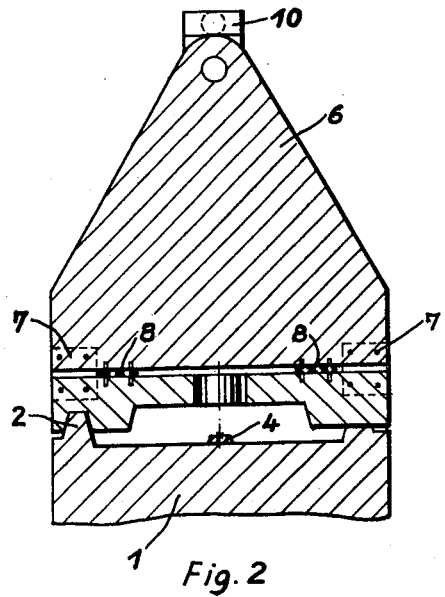
FIG. 2 is a vertical cross sectional view along the line II—II of FIG. 1.

Referring to FIGS. 1 and 2, the machine bed 1 is provided with a horizontal guide way 2 for the displacement of the carriage structure 3 of the length measuring machine. A measuring scale 4 is fixedly mounted in a position parallel to the guide way 2. An objective 12 arranged in the carriage structure 3 projects a portion of the measuring scale which is positioned directly below the objective 12 by means of an inclined mirror 13 and the lenses 14 and 15 into a conventional reading device. The carriage structure 3 consists of a lower carriage 5 which is slidable on the guide way 2 and an upper carriage 6 which is tiltably mounted on top of the lower carriage 5. The upper carriage 6 is pivotally connected with the lower carriage 5 by two cross joints 7 and 8. The upper carriage 6 has threadedly mounted therein a screw 9 the lower end of which is supported upon the top surface of the lower carriage 5. Therefore, when this screw 9 is rotatably adjusted the top carriage 6 will be tilted about the axis of the cross spring joints 7 and 8. The upper carriage 6 carries a level 10 which permits an observation and adjustment of the tilting movement. The upper carriage 6 also carries a tail spindle 11, the point A of which is used for engaging the workpiece to be measured. The necessary displacement of the carriage structure 3 is indicated on the measuring scale 4. The tail spindle 11 is slidably movable in the upper carriage 6 against the pressure of a spring 17 so that the pressure with which the tail spindle engages the article to be measured will always be uniform. The tail spindle 11 carries within a recess 6a of the upper carriage 6 a carrier 11a for the mirror 13 and the lens 14 so that during an axial displacement of the tail spindle 11 the optical axis of the lens 12 is moved along the scale 4. The two lenses 14 and 15 supplement each other to form a plane parallel plate.

The operation of this device is as follows: When the carriage structure 3 tilts clockwise about a small angle, for instance about the point $M_0$ as a result of an inaccuracy in the guide way 2, then the tail spindle 11 will be positioned inclined with respect to the guide way 2. The point A of the tail spindle 11, if it were fixedly related to the upper carriage 6, would move clockwise during this tilting movement along a circular arc about the point $M_0$. Owing to the pressure of the spring 17 the tail spindle 11 will be moved, relative to the upper carriage, back toward the left against the workpiece W. When this happens the lens 12 is slidably displaced and the vertical optical axis of the same does no longer point toward the measuring point $M_0$ but will point to a point adjacent thereto so that an incorrect measuring value is indicated in the reading device. During the mentioned tilting movement of the carriage structure 3 the bubble of the tubular level 10 is also displaced from its central position. When the operator now adjusts the screw 9 until the bubble has been moved again to its central position then the tail spindle 11 will also again be positioned parallel to the guide way 2. The workpiece W urges the point A of the tail spindle 11 again into substantially its old position so that the optical axis of the lens 12 will again point toward the measuring point $M_0$.

FIGS. 3 and 4 illustrate a modified embodiment of the length measuring machine. The guide way 2 again is provided with a slidably mounted carriage structure 3'. The carriage structure 3' is, however, adjustable step by step by means of a series of abutments 34 on the guide way 2'. The carriage structure 3' is provided with an abutment pin 35 which by means of a pivoted latching device 36 may be brought out of engagement with the abutments 34. After the carriage structure has been slidably displaced to the desired position, the abutment pin 35 is again brought into engagement with the end face of one of the abutment 34. For the purpose of bridging or measuring intermediate positions of the carriage with respect to the abutments 34 the carriage structure 3' is provided with a tail spindle 32 which is adjustable by means of a micrometer 33. The carriage structure 3' is subdivided into a lower carriage 5' and an upper carriage 6'. The carriage parts 5' and 6' are again pivotally connected with each other by two fixedly mounted straps 37 and 38. In order to minimize displacement of the upper carriage 6' in the measuring direction, there are arranged between the lower carriage 5' and the upper carriage 6' two balls 39 and 39' about which the upper carriage 6' may be tilted.

For the purpose of measuring the workpiece W' the latter is placed in conventional manner between the tail spindles 31 and 32 by moving the carriage structure 3' as far as possible and then is locked against one of the abutments 34. Thereupon the tail spindle 32 is brought into engagement with the workpiece W' with the assistance of the micrometer 33. The tail spindle 31 is fixedly mounted in the tail stock 30. On the tail stock 30 is mounted a collimator 40. The indication mark 41 of the collimator 40 is projected by the objective 42 into infinity. The light rays which pass through the objective 42 enter a straight line telescope 43 mounted on the carriage structure 3' and are employed for energizing a photoelectric cell 44. The telescope 43 has mounted thereon prisms 45 and 46 which split the light beam which enters the telescope and then recombine these partial light beams. The two partial light beams are modulated at 180 degrees phase difference by means of a make and break device 47 so that the photoelectric cell 44 produces an alternating current. This alternating current is conducted to an amplifier 48 and the latter energizes a resetting motor 49. The motor 49 operates a screw 50 which is in threaded engagement with the upper carriage 6' and which engages with its lower end the lower carriage 5'. When the screw 50 is rotated by the motor 49 the upper carriage 6' is tilted with respect to the lower carriage 5' about the axis B—B. This axis of rotation according to FIG. 4 is positioned directly above the guide way of the carriage structure 3'.

The operation of this device is a follows: If the carriage structure 3' should tilt clockwise as a result of an error in the guide way 2' then the tail spindle 32 would, if fixedly related to the part 6, no longer engage the workpiece W'. It would heretofore have been necessary to adjust the tail spindle 32 by means of the micrometer 33 but if this were done, the micrometer drum of the micrometer would indicate an incorrect measuring value.

With the present device, during tilting movement of the carriage structure 3' the image of the indicating mark 40 in the straight line telescope 43 is displaced. This displacement is sensed by the photoelectric cell 44 and the latter controls the resetting motor 49 until the upper carriage 6' has been rotatably adjusted so that the optical axis of the straight line telescope 43 is again positioned parallel to the optical axis of the collimator. When this position is reached, the resetting operation is completed. During this resetting the point of the tail spindle 32 moves accordingly so that it again engages the workpiece W'. The axis B—B is arranged in the plane of the series of abutments 34 so that during the return of the upper carriage substantially no residuary error can take place.

What I claim is:

1. In a measuring device including means forming a horizontal guide way provided with a series of spaced abutments, and a carriage structure slidably mounted on said guide way and having means for selectively engaging said abutments to arrest said carriage structure, said carriage structure consisting of a lower part slidably supported by said guide way and an upper part pivotally connected to said lower part about a horizontal axis extending transversely to said guide way and closely adjacent thereto, a tail stock having a tail spindle thereon fixedly mounted at one end of said guide way, a tail spindle mounted slidably in said upper part and adapted to be slidably moved against the pressure of a spring in said upper part when a workpiece to be measured is placed between said two tail spindles, said stationary tail stock and said upper part of said carriage structure having each means mounted thereon which in cooperation with each other indicate any deviation of said upper part from a horizontal position, and micrometer means connected with said slidable tail spindle and adapted to adjust the latter.

2. In a measuring device as claimed in claim 1, said stationary tail stock having mounted thereon a collimator arranged in axial alignment with a straight line telescope which is fixedly attached to said upper part of said carriage structure.

3. In a measuring device as claimed in claim 1, said stationary tail stock having mounted thereon a collimator arranged in axial alignment with a straight line telescope which is fixedly attached to said upper part of said carriage structure, and said carriage structure further having a photo cell in said telescope, means for adjusting the position of said pivotally mounted upper part with respect to said lower part, and means including a resetting motor energized by the photo cell current for actuating said adjusting means for said upper part.

4. In a measuring device as claimed in claim 1, said stationary tail stock having mounted thereon a collimator arranged in axial alignment with a straight line telescope which is fixedly attached to said upper part of said carriage structure, and said carriage structure further having a photo cell in said telescope, means for adjusting the position of said pivotally mounted upper part with respect to said lower part, means including a resetting motor energized by the photo cell current for actuating said adjusting means for said upper part, means for splitting the light beam entering said telescope before it reaches said photo cell, and means for modulating the two partial light beams to produce an alternating current for operating said resetting motor.

References Cited in the file of this patent

Gradenwitz: "A Novel Measuring Machine," Scientific American, vol. 89, No. 11, Sept. 12, 1903.